(12) United States Patent  (10) Patent No.: US 7,364,303 B2
Inoko  (45) Date of Patent: Apr. 29, 2008

(54) IMAGE DISPLAY APPARATUS

(75) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 11/216,802

(22) Filed: Aug. 30, 2005

(65) Prior Publication Data

US 2006/0044516 A1  Mar. 2, 2006

(30) Foreign Application Priority Data

Aug. 31, 2004  (JP) .............................. 2004-252317

(51) Int. Cl.
G03B 21/14 (2006.01)
G03B 21/28 (2006.01)
G02B 5/30 (2006.01)
G02B 27/28 (2006.01)
G02F 1/1335 (2006.01)
G02F 1/13 (2006.01)
G09G 3/18 (2006.01)
G09G 3/36 (2006.01)

(52) U.S. Cl. ........................ 353/20; 353/84; 353/81; 353/33; 353/121; 359/495; 349/5; 349/193; 345/38; 345/50; 345/87

(58) Field of Classification Search ................. 353/84, 353/20, 81, 33, 121; 359/490, 495; 349/5, 349/193; 345/38, 50, 87
See application file for complete search history.

(56) References Cited

U.S. PATENT DOCUMENTS

| | | |
|---|---|---|
| 5,658,490 A | 8/1997 | Sharp |
| 5,751,384 A | 5/1998 | Sharp |
| 5,822,021 A | 10/1998 | Johnson |
| 5,929,946 A | 7/1999 | Sharp |
| 5,953,083 A | 9/1999 | Sharp |
| 5,990,996 A | 11/1999 | Sharp |
| 5,999,240 A | 12/1999 | Sharp |
| 6,046,786 A | 4/2000 | Sharp |
| 6,049,367 A | 4/2000 | Sharp |
| 6,078,374 A | 6/2000 | Sharp |
| 6,183,091 B1 | 2/2001 | Johnson |
| 6,252,638 B1 | 6/2001 | Johnson |
| 6,273,571 B1 | 8/2001 | Sharp |
| 6,310,673 B1 | 10/2001 | Sharp |
| 6,380,997 B1 | 4/2002 | Sharp |
| 6,417,892 B1 | 7/2002 | Sharp |
| 6,452,646 B1 | 9/2002 | Sharp |
| 7,131,729 B2 * | 11/2006 | Suzuki et al. ................ 353/20 |
| 2002/0140905 A1 | 10/2002 | Ouchi |
| 2003/0147051 A1 * | 8/2003 | Fujita et al. ................ 353/31 |
| 2005/0185141 A1 * | 8/2005 | Fujita et al. ................ 353/20 |

FOREIGN PATENT DOCUMENTS

| | | |
|---|---|---|
| EP | 0734182 B1 | 1/2001 |
| JP | 11-153774 A | 6/1999 |
| JP | 2001-154268 A | 6/2001 |
| JP | 2002-122810 A | 4/2002 |
| JP | 2002-357708 A | 12/2002 |

* cited by examiner

Primary Examiner—Diane I. Lee
Assistant Examiner—Magda Cruz
(74) Attorney, Agent, or Firm—Canon U.S.A., Inc., IP Division

(57) ABSTRACT

At least one exemplary embodiment is directed to an image display apparatus, which can include multiple color combining elements, multiple light modulating elements, and a projection optical system, operatively connected to reduce the effects of ghost light.

15 Claims, 8 Drawing Sheets

FIG. 5
(A) HOW COLOR COMBINING ELEMENT POLARIZES LIGHT IN FIRST EXEMPLARY EMBODIMENT
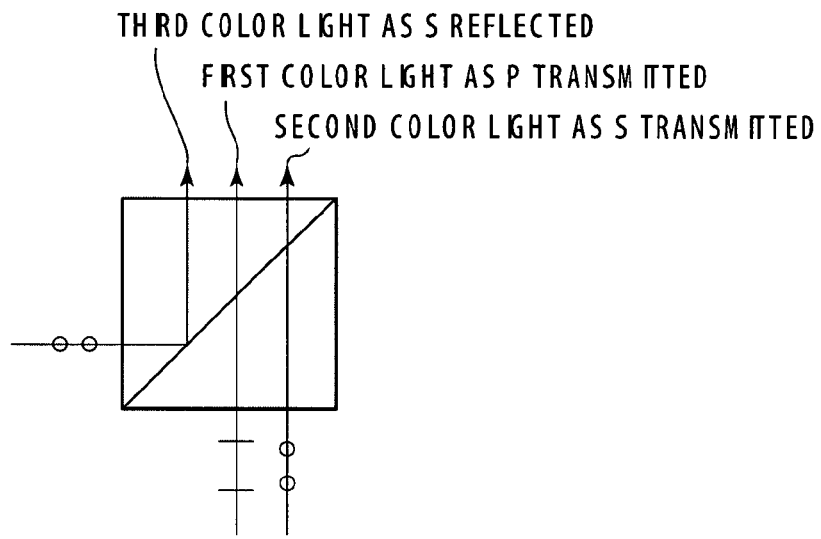
(B) HOW COLOR COMBINING ELEMENT POLARIZES LIGHT IN SECOND EXEMPLARY EMBODIMENT
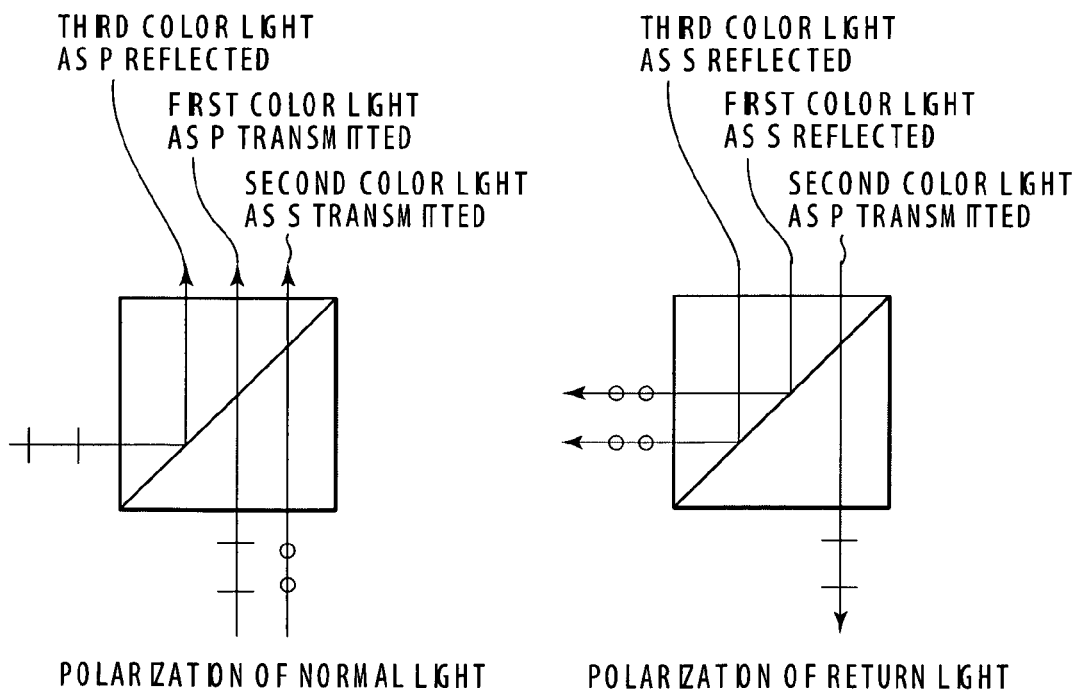
POLARIZATION OF NORMAL LIGHT        POLARIZATION OF RETURN LIGHT FIG. 6
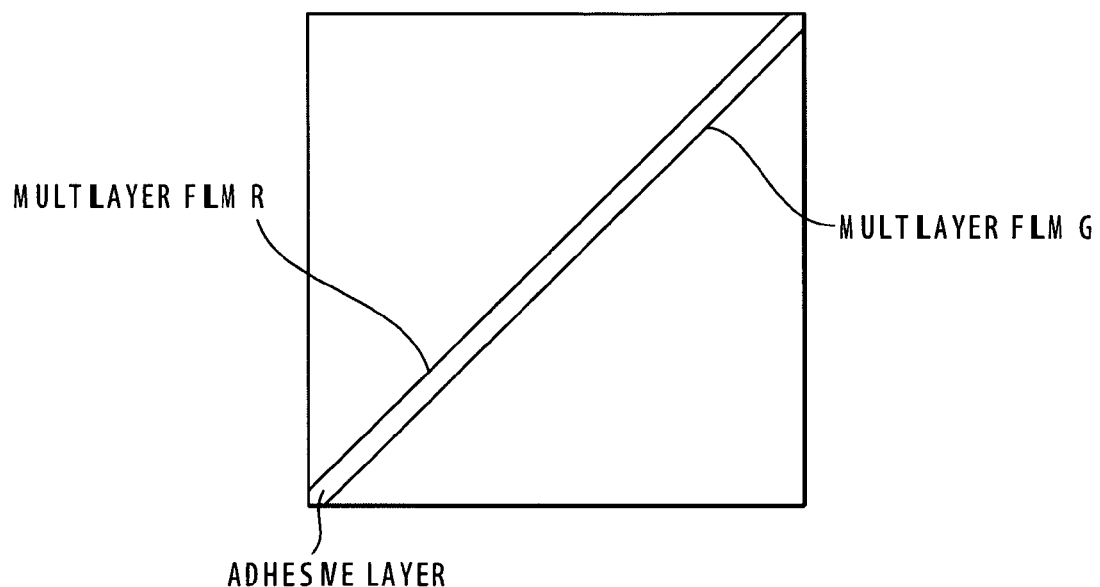
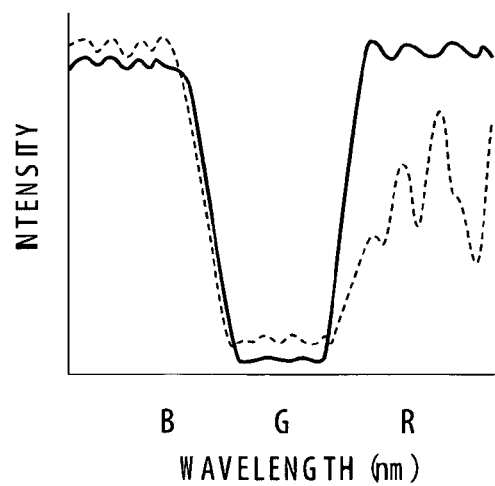
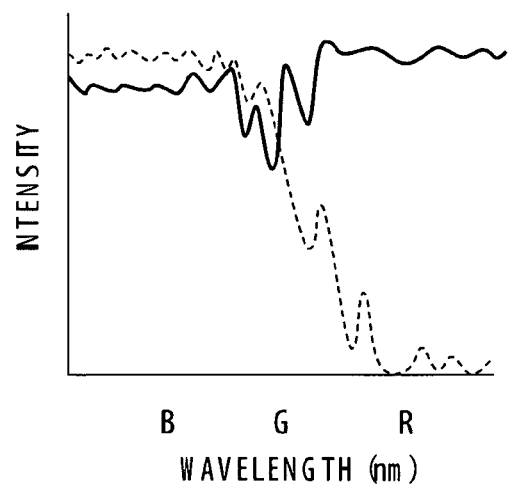
——————— P-POLARIZATION
--------------- S-POLARIZATION --Prior Art--

TRANSMITTANCE CHARACTERISTICS OF S-POLARIZATION (DASHED LINE) AND P-POLARIZATION (SOLID LINE) RELATIVE TO WAVELENGTH

IMAGE DISPLAY APPARATUS

BACKGROUND OF THE INVENTION

1. Field of the Invention

The present invention relates to an image display apparatus (projector), more particularly, although not exclusively, an image display apparatus which can use reflective liquid crystal elements.

2. Description of the Related Art

Since the reflective liquid crystal panel has advantages over a transmissive liquid crystal panel (e.g., high numerical aperture, high definition) attention is being given to a projector which can use reflective liquid crystal panels. Such a projector can switch over between display (a bright state to project light) and non-display (a dark state not to project light) of each pixel of an image on a screen through modulation of each reflective liquid crystal panel. Further, corresponding polarizing beam splitters are arranged in front of multiple liquid crystal panels, respectively, in the projector to separate light from a light source into multiple color beams and combine the color beams from the liquid crystal panels. Therefore, a color separating/combining system of such a reflective liquid crystal projector generally tends to be large in size.

In order to address this problem, US patent publication 2002/0140905 A1 discusses a projector which can use three polarizing beam splitters to perform color separation and combination in cooperation with three reflective liquid crystal panels for three primary colors. FIG. 7 illustrates the structure of the projector.

A polarization converting element 3a located in the course of an illumination optical system brings these beams to the same s-polarization state. As a result, these beams turn into an s-polarized red beam 4R, an s-polarized green beam 4G, and an s-polarized blue beam 4B, respectively. The optical element 5 is dichroic mirror 5 has the property of reflecting primarily green light. The color beams 4R and 4B that passed through the optical element 5 pass through a polarizing plate 7a to increase their degree of polarization, and enter a wavelength-selective polarization rotating element 9. The wavelength-selective polarization rotating element 9 has such a property as to rotate the polarization direction of the blue light component 90 degrees while not rotating the red light component. After passing through the wavelength-selective polarization rotating element 9, the red beam and the blue beam that are originally s-polarized light turn into an s-polarized red beam 10R and a p-polarized blue beam 10B, respectively, and enter a polarizing beam splitter 11. The beam 10R incident on the polarizing beam splitter 11 is reflected on a polarization split face 11a to enter a reflective liquid crystal panel 13R. When a corresponding pixel in the reflective liquid crystal panel 13R is in an ON state (such a bright state to project light on a screen) and the red beam 10R enters the pixel, it turns into a p-polarized red beam 14R and enters the polarizing beam splitter 11 again. The p-polarized red beam 14R passes through the polarization split face 11a and exits from the polarizing beam splitter 11. On the other hand, the blue beam 10B is p-polarized, so that it passes through the polarization split face 11a and enters a reflective liquid crystal panel 13B. When entering an on-state pixel in the reflective liquid crystal panel 13B, the blue beam 10B turns into an s-polarized blue beam 14B, and enters the polarizing beam splitter 11 again. Since the blue beam is s-polarized, it is reflected on the polarization split face 11a and exits from the polarizing beam splitter 11.

On the other hand, the beam 4G reflected by the optical element 5 passes through a polarizing plate 25 to increase its degree of polarization, and enters a polarizing beam splitter 27 to reach a polarization split face 27a. Since the green beam 4G is s-polarized, it is reflected on the polarization split face 27a and enters a reflective liquid crystal panel 29G. When entering an on-state pixel in the reflective liquid crystal panel 29G, the green beam 4G is converted (modulated) to a p-polarized green beam 30G and enters the polarizing beam splitter 27 again. The p-polarized green beam 30G is transmitted through the polarization split face 27a and exits from the polarizing beam splitter 27.

Also illustrated is a wavelength-selective polarization rotating element 16. The wavelength-selective polarization rotating element 16 has such a property as to rotate the polarization direction of the blue light component 90 degrees while not rotating the red light component. After passing through the wavelength-selective polarization rotating element 16, the red beam and the blue beam turn into a p-polarized red beam 19R and a p-polarized blue beam 19B, respectively, and enter a polarizing beam splitter 20. Also illustrated is a half-wave plate 34. The half-wave plate 34 has such a property as to rotate the polarization direction 90 degrees. After passing through the half-wave plate 34, the green beam 31G is an s-polarized green beam 35G, and enters the polarizing beam splitter 20. Then the beam 35G is reflected by the polarization split face 20a to reach a projection lens 24. Then the beams 19R, 19B pass the polarization split face 20a and reach a projection lens 24.

This patent publication discusses the use of a polarizing beam splitter 11, two reflective liquid crystal panels 13R and 13B, wavelength-selective polarization rotating elements 9 and 16 arranged on the light incident and exit sides of the polarizing beam splitter 11 to perform display/non-display selection (control) of color beams from two reflective liquid crystal panels 13R and 13B.

SUMMARY OF THE INVENTION

At least one exemplary embodiment is directed to a projector which separates a flux of light from a light source into multiple color beams, guides the respective color beams to corresponding reflective liquid crystal panels (liquid crystal display elements), combines the color beams modulated by the reflective liquid crystal panels, and projects an enlarged image of the combined light onto a projected surface through a projection optical system.

At least one exemplary embodiment is directed to an image display apparatus including: a first light modulating element configured to modulate light in a first wavelength band; a second light modulating element configured to modulate light in a second wavelength band different from the first wavelength band; a third light modulating element configured to modulate light in a third wavelength band different from both the first wavelength band and the second wavelength band; a first color combining element configured to combine a first image light exiting from the first light modulating element and second image light exiting from the second light modulating element; a second color combining element configured to combine a third image light modulated by the third light modulating element with the first image light and the second image light combined by the first combining element to form color combined image light; and a projection optical system configured to project the combined image light formed by the second color combining element onto a projected surface.

In at least one exemplary embodiment, the first image light enters the second color combining element in the form of a first substantially linearly-polarized beam. The second image light can enter the second color combining element in the form of a second substantially linearly-polarized beam. Where the polarization direction of the first substantially linearly-polarized beam and the polarization direction of the second substantially linearly-polarized beam are substantially perpendicular to each other.

In at least one exemplary embodiment, the second color combining element guides the first substantially linearly-polarized beam of the light in the first wavelength band to the projection optical system and blocks the second substantially linearly-polarized beam of the light in the first wavelength band from entering the projection optical system. The second color combining element guides both the first substantially linearly-polarized beam and the second substantially linearly-polarized beam of the light in the second wavelength band to the projection optical system.

Further features of the present invention will become apparent from the following description of exemplary embodiments (with reference to the attached drawings).

BRIEF DESCRIPTION OF THE DRAWINGS

FIGS. 5A and 5B illustrate how a color combining element polarizes each color beam.

FIG. 6 illustrates an example of the color combining element.

DESCRIPTION OF THE EMBODIMENTS

Figure 1:
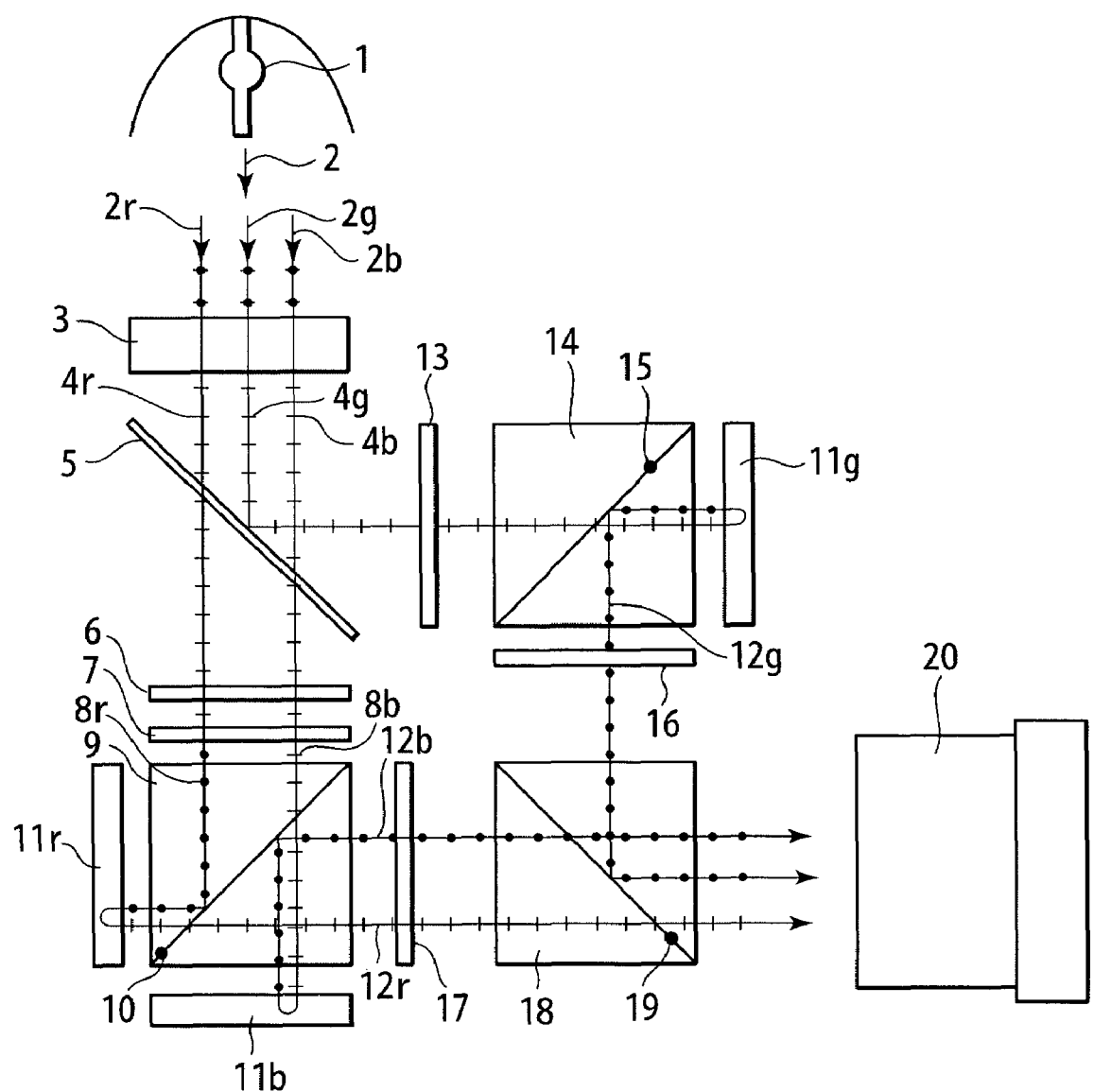
FIG. 1 illustrates the structure of a color separating/combining system according to a first exemplary embodiment.

The following description of exemplary embodiment(s) is merely illustrative in nature and is in no way intended to limit the invention, its application, or uses Processes, techniques, apparatus, and materials as known by one of ordinary skill in the relevant art may not be discussed in detail but are intended to be part of the enabling description where appropriate.

Additionally the actual size of optical elements may not be discussed however any size from macro lenses to nano lenses are intended to lie within the scope of exemplary embodiments (e.g., lenses with diameters of nanometer size, micro size, centimeter size, and meter sizes).

Notice that similar reference numerals and letters refer to similar items in the following figures, and thus once an item is defined in one figure, it may be discussed for following figures.

The following describes exemplary embodiments. In at least one exemplary embodiment, an image display apparatus includes three reflective liquid crystal elements (which can be four or more) corresponding to three color beams, respectively, a color combining system for combining three color beams exiting from the three reflective liquid crystal elements, respectively, and a projection optical system for projecting the combined light of the three color beams. The term "color beam" means a beam within a predetermined wavelength band. To be more specific, the color beam means a beam of light having any wavelength within a visible wavelength band including, but not limited to, red light, green light, and blue light, (e.g., light in a wavelength band of 420 to 550 nm, 550 to 700 nm, 420 to 480 nm, or 640 to 700 nm).

The color combining system includes a color combining element. The color combining element guides, among three color beams, a first color beam in a first polarization direction to the projection optical system or blocks, from the projection optical system, the first color beam in a second polarization direction substantially perpendicular to the first polarization direction. On the other hand, it guides a second color beam of the three color beams to the projection optical system regardless of its polarization direction. The color combining system also includes a wavelength-selective polarizer for blocking the second color beam in the first polarization direction from entering the projection optical system and guiding the second color beam in the second polarization direction to the projection optical system. The wavelength-selective polarizer absorbs the second color beam in the first polarization direction. Another wavelength-selective polarizer functions of a polarizing plate for a third color beam of the three color beams, or to absorb the third color beam. The color combining system further includes a polarizing beam splitter for combining the first and second color beams. The wavelength-selective polarizer is arranged between the polarizing beam splitter and the color combining element. The color combining system can further include a retardation plate (phase plate) arranged between the color combining system and the projection optical system.

In another exemplary embodiment, an image display apparatus includes three reflective liquid crystal elements for three color beams, respectively, a color combining system for combining three color beams exiting from the three reflective liquid crystal elements, respectively, and a projection optical system for projecting the combined light of the three color beams. The color combining system includes a wavelength-selective polarizer, which guides a first color beam of the three color beams to the projection optical system regardless of its polarization direction, while it blocks a second color beam in a first polarization direction from entering the projection optical system or guides, to the projection optical system, the second color beam in a second polarization direction substantially perpendicular to the first polarization direction.

In still another exemplary embodiment, an image display apparatus includes first, second, and third reflective liquid crystal elements for first, second, and third color beams, respectively, an illumination system for illuminating the first, second, and third reflective liquid crystal elements with light from a light source, a color combining system for combining three color beams exiting from the three reflective liquid crystal elements, respectively, and a projection optical system for projecting the combined light of the three color beams. This structure includes: a color separating element configured to separate the third color beam from the first and second color beams; a first polarizing beam splitter for guiding the third color beam to the third reflective liquid crystal element when the third color beam is in an intended polarization direction, and analyzing a beam reflected from the third reflective liquid crystal element; a second polarizing beam splitter for guiding the first and second color beams separated by the color separating element from the third color beam to the first and second reflective liquid crystal elements, respectively, and analyzing beams reflected from the second and third reflective liquid crystal elements; and a color combining element for combining the third color beam from the first polarizing beam splitter with the first and second color beams from the second polarizing beam splitter.

The color combining element guides the first color beam in a first polarization direction to the projection optical system, and blocks the first color beam in a second polarization direction substantially perpendicular to the first polarization direction from entering the projection optical system. On the other hand, it guides the second color beam to the projection optical system regardless of its polarization direction. The image display apparatus also includes a wavelength-selective polarizer arranged in an optical path between the second beam splitter and the color combining element for absorbing the second color beam in the first polarization direction and guiding the second color beam in the second polarization direction to the projection optical system. The image display apparatus can further include a quarter-wave plate arranged between the color combining element and the projection optical system.

In yet another exemplary embodiment, an image display apparatus is a projection type image display apparatus in which light from a light source is modulated by and reflected from a corresponding reflective liquid crystal panel through a polarizing beam splitter in response to any picture signal so that the light passing through the polarizing beam splitter again will be projected on a screen through a projection lens. The projection type image display apparatus includes color separating device configured to separate the optical path of white light from a light source into a first optical path for a third color beam and a second optical path for first and second color beams. The projection type image display apparatus also includes a first polarizing beam splitter and a third reflective liquid crystal panel for reflecting the third color beam arranged in the first optical path, and a second polarizing beam splitter and first and second reflective liquid crystal panels for reflecting the first and second color beams, respectively, a substantial portion of which are arranged in the second optical path. The projection type image display apparatus further includes optical path combining device configured to combine the beams passing through the first and second optical paths, respectively, to project the combined light through the projection lens. The second polarizing beam splitter is operative to separate non-polarized light into a first polarization state and a second polarization state. A polarizing plate with an analyzing function is arranged in an optical path along which the beams passing through the second optical path reaches the optical path combining device. The polarizing plate facilitates passage of the first color beam through regardless of whether it is in the first or second polarization state. On the other hand, the polarizing plate absorbs the second color beam in the first polarization state and facilitates passage of the second color beam in the second polarization state through. The optical path combining device serves as a so-called polarizing beam splitter to direct the first color beam in the first polarization state toward the projection lens and not to direct the first color beam in the second polarization state to the projection lens while directing the second color beam to the projection lens regardless of its polarization direction.

FIG. 1 illustrates the structure of a first exemplary embodiment of a color separating/combining system. The exemplary embodiment will be described in detail which can use the accompanying drawings.

FIRST EXEMPLARY EMBODIMENT

The first exemplary embodiment will be described in detail below which can use FIG. 1. White light 2 from a light source 1 is reflected by a reflector and turns into substantially parallel light. Here, the reflector is a parabolic mirror, but it can be an elliptical mirror or a spherical mirror. In FIG. 1, the white light is illustrated by separating it into beams for three primary colors, red, green, and blue. The color beams are indicated as a red beam 2r, a green beam 2g, and a blue beam 2b, respectively. Note that although the red, green, and blue beams are spatially separated for convenience, the three beams are not spatially separated at this stage in an actual situation.

A polarization converting element 3 in an illumination optical system brings these beams to the same p-polarization state (such a polarization state that the electric field vibrates in a direction parallel to the paper surface of FIG. 1). As a result, these beams turn into a p-polarized red beam 4r, a p-polarized green beam 4g, and a p-polarized blue beam 4b, respectively. The polarization converting element 3 can convert these beams into s-polarized red, green, and blue beams, respectively.

The three color beams that passed through the polarization converting element 3 enter a optical element 5 (e.g., dichroic mirror). The optical element 5 has the property of reflecting substantially the green light component, so that it facilitates the passage of the red and blue beams through while reflecting the green beam, thereby separating the green beam from the other color beams. The color beams 4r and 4b that passed through the optical element 5 have a higher degree of polarization than those before entering the optical element 5, and enter a wavelength-selective polarization rotating element 7, which functions as a retardation plate primarily for light in a predetermined wavelength band, that is, for rotating the polarization direction of light in the predetermined wavelength band alone. Instead of the three color beams for red, green, and blue, the optical element 5 can separate four beams in four wavelength bands into two groups of color beams so that a subsequent polarizing beam splitter will further separate each separated group of color beams. Further, the polarizing plate 6 is optional. If the optical element 5 has good performance, the polarizing plate 6 can be omitted.

The wavelength-selective polarization rotating element 7 has such a property as to rotate the polarization direction of red color light (component) 90 degrees, while allowing blue light (component) to pass through without rotating the polarization direction of the blue light (component). The color beams 4r and 4b that passed through the wavelength-selective polarization rotating element 7 turn into an s-polarized red beam 8r and a p-polarized blue beam 8b and enter a polarizing beam splitter 9.

The red beam 8r incident on the polarizing beam splitter 9 is reflected on a polarization split face 10 and enters a reflective liquid crystal panel 11r. Among pixels in reflective liquid crystal panels (11r, 11g, 11b), one pixel in the ON (bright) state rotates the polarization direction of incident light 90 degrees, while the other pixel in the OFF (dark) state do not rotate the polarization direction of the incident light. Therefore, when the pixel is in the ON state, the red beam 8r turns into a p-polarized red beam 12r and enters the polarizing beam splitter 9 again. In this case, since the red beam 12r is p-polarized, the polarizing beam splitter 9 facilitates the exit of the red beam 12r therefrom. When the pixel is in the OFF state, the red beam 12r is reflected by the polarization split face. This process is not illustrated in FIG. 1. In at least one exemplary embodiment, a retardation plate (quarter-wave plate), not shown, can be arranged between the polarizing beam splitter and the reflective liquid crystal panel in order to orient the polarization direction of an oblique incident beam.

On the other hand, the blue beam 8b is p-polarized, so that it passes through the polarization split face 10 and enters the reflective liquid crystal panel 11b. When the pixel is in the ON state, the blue beam 8b turns into an s-polarized blue beam 12b and enters the polarizing beam splitter 9 again. In this case, since the blue beam 12b is s-polarized, it is reflected by the polarization split face 10 and exits from the polarizing beam splitter 9.

The green beam 4g reflected by the optical element 5 passes through a polarizing plate 13 to increase its degree of polarization. The green beam 4g (e.g., one having a higher degree of polarization) enters a polarizing beam splitter 14 and reaches a polarization split face 15. Since the green beam 4g is p-Polarized, it passes through the polarization split face 15 and enters the reflective liquid crystal panel 11g. When the pixel is in the ON state, the green beam 4g turns into an s-polarized green beam 12g and enters the polarizing beam splitter 14 again. In this case, since the green beam 12g is s-polarized, it is reflected by the polarization split face 15 and exits from the polarizing beam splitter 14. The polarizing plate 13 is optional, and it can be omitted.

In addition to the ideal color beam 12r, 12g, or 12b from a corresponding pixel in the ON state, each color beam exiting from each polarizing beam splitter and directed to a color combining element 18 contains light (leakage light) incident on the color combining element 18 from some OFF-state pixel through the polarizing beam splitter 9 or 14. Since the leakage light actually contains such a component as to reduce the contrast of an image, in at least one exemplary embodiment, the unnecessary polarized component can be reduced by some optical element (e.g., a polarizing element). The green beam 12g exiting from the polarizing beam splitter 14 reaches a polarizing plate 16 by which the unnecessary polarized component can be reduced. The beam 12g then enters the color combining element 18. The polarizing plate 16 can be omitted.

The red beam 12r and the blue beam 12b exiting from the polarizing beam splitter 9 reach a wavelength-selective polarizer 17. The wavelength-selective polarizer 17 functions as a polarizing plate primarily for blue light without affecting red light. Therefore, the unnecessary polarized component can be reduced from the beam 12b, and the beam 12r with some unnecessary polarized component enters the color combining element 18. Such a wavelength-selective polarizer can be made by selecting an appropriate molecular dye material, for example, as discussed in Japanese patent application laid-open No. 2003-215338.

Figure 2:
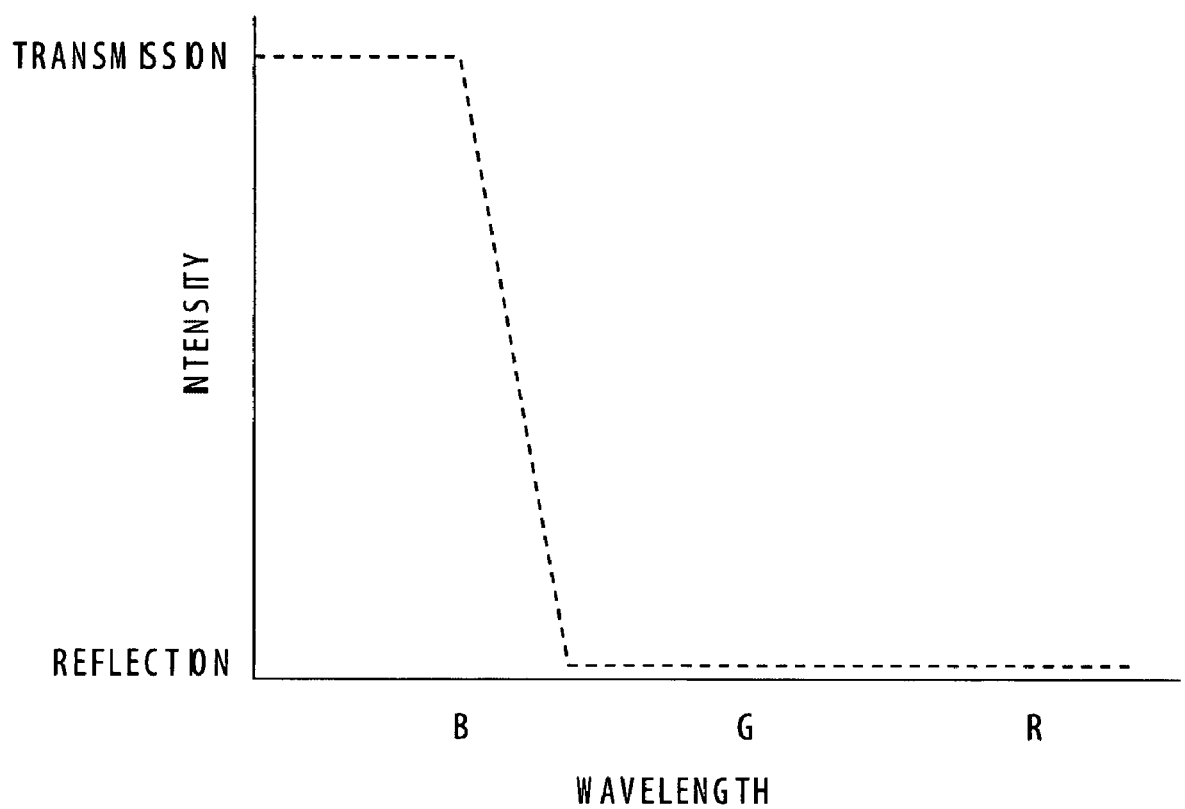
FIG. 2 illustrates a graph showing characteristics for the separating/combining system of the first exemplary embodiment.
Figure 4:
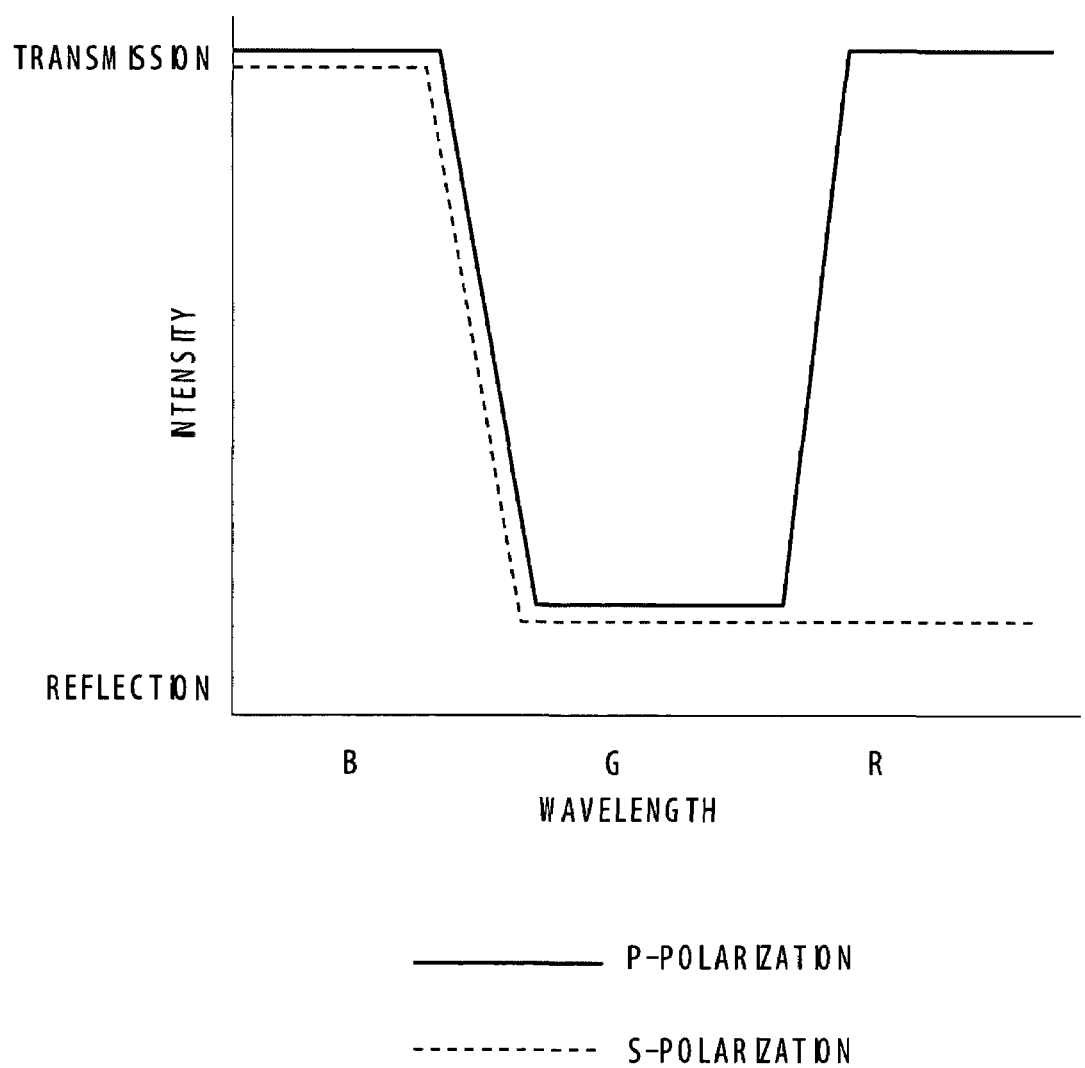
FIG. 4 illustrates a graph showing characteristics for the separating/combining system of the second exemplary embodiment.
Figure 7:
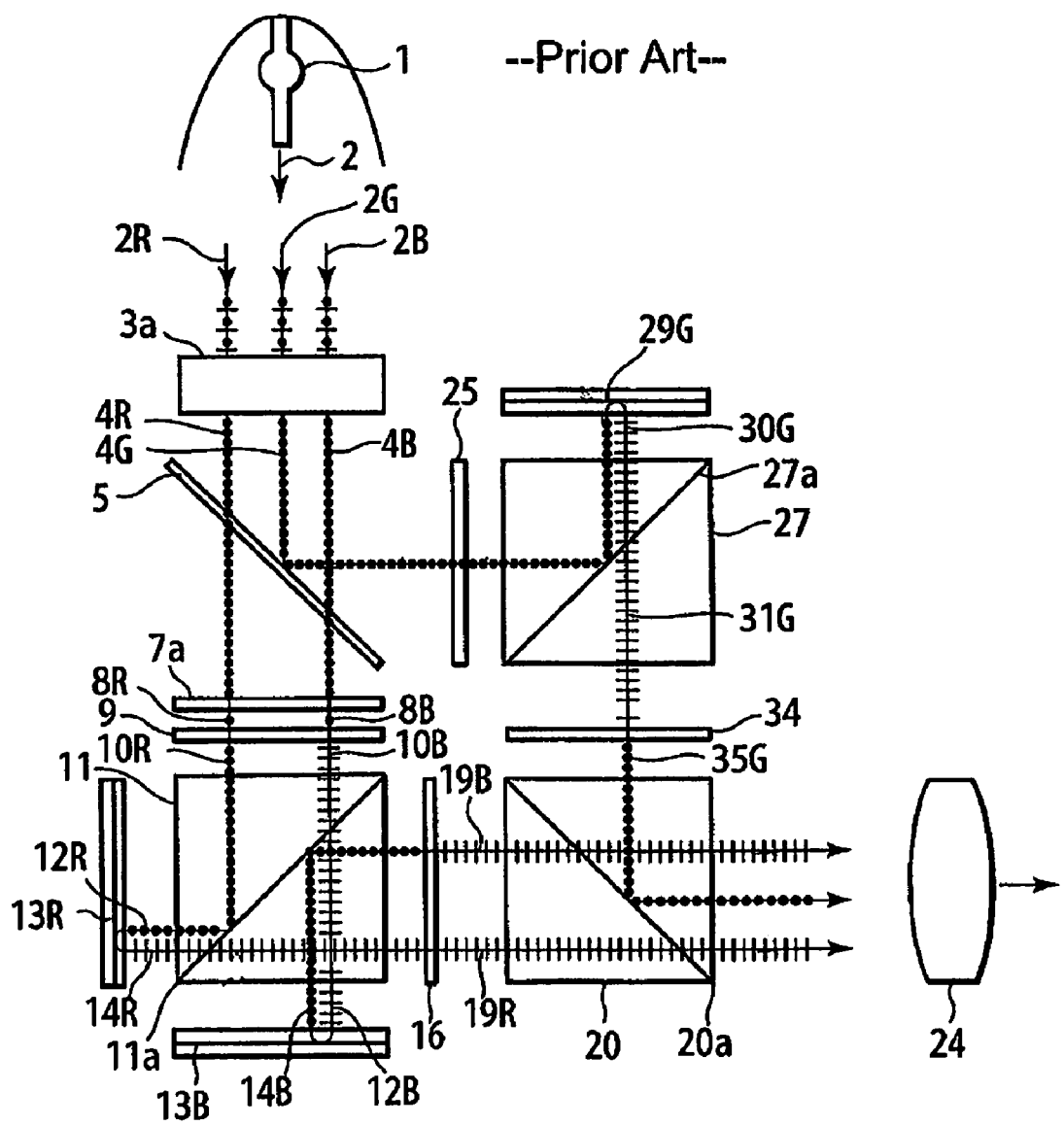
FIG. 7 illustrates the structure of a conventional separating/combining system.

FIG. 2 illustrates characteristics for the color combining element 18 in the first exemplary embodiment. FIG. 2 plots transmittance on the ordinate and wavelength on the abscissa. The transmittance on the ordinate is higher at the top and lower at the bottom. The wavelength on the abscissa is shorter on the left side and longer on the right side. Although FIG. 2 does not show the characteristics for p-polarized light in both the blue wavelength band and the green wavelength band, the color combining element can have any transmission properties. For example, it can have properties as described in a second exemplary embodiment (see FIG. 4), but the property for light in the green wavelength band can be the same as that for light in the red wavelength band. Further, the p-polarized light in the blue wavelength band can have high reflectance, but in at least one exemplary embodiment sets high transmittance to the p-polarized light in the blue wavelength band in the same manner as in the second exemplary embodiment (FIG. 4). FIG. 5A is a schematic illustration.

It is apparent from FIG. 5A that the color combining element 18 transmits the s-polarized blue light (second color light), reflects the p-polarized green light (third color light), and transmits the p-polarized red light (first color light) in this order from the shortest wavelength. The color combining element 18 can have any transmission properties related to light in the other bands, that is, related to the p-polarized blue beam, the s-polarized green beam, and the s-polarized red beam. In at least one exemplary embodiment, the color combining element 18 reflects the s-polarized red light. In such a structure, a color combining face 19 functions as a polarizing beam splitter for red light.

The color combining element 18 can be formed of dielectric multilayer films. FIG. 6 illustrates an example of the structure of the color combining element 18. In FIG. 6, the color combining element is made up by bonding two prisms together. It has multilayer films R and G on the bonded surface through an adhesive layer. The adhesive layer can be omitted. For example, the prisms can be brought in tight contact to each other by optical contact, bonded on an area other than the color combining face 19, or held integrally without adhesive ubonding, or other techniques as known by one of ordinary skill in the relevant arts and equivalents.

The multilayer film R is such a so-called dichroic film that transmits R, reflects G, and transmits B, where R is light in the red wavelength band, G is light in the green wavelength band, and B is light in the blue wavelength band. Note that the transmittance of s-polarized red light can take any value. Setting any value for the transmittance of light in any wavelength band makes it easy to design the multilayer films. Here, the transmittance of light in a wavelength band of 620 to 700 nm is set to any percentage not less than 20 percent nor more than 85 percent.

The multilayer film G transmits both of p- and s-polarized blue light. On the other hand, the multilayer film G functions as a so-called PBS (Polarizing Beam Splitter) for red light, that is, it reflects s-polarized red light and transmits p-polarized red light. The multilayer film G reflects green light regardless of whether it is s-polarized or p-polarized. Therefore, the green light does not reach the multilayer film G.

For this reason, the properties of the multilayer film G concerning the green light can be determined arbitrarily. Here, the multilayer film G is designed to set the transmittance of s-polarized light with an approximately central wavelength of 550 nm for green light to any percentage not less than 30 percent nor more than 70 percent.

Although these two multilayer films are adjacent to each other through the adhesive layer, since the adhesive layer has such a thickness that it is not affected by light interference, there is virtually no influence of one film on the properties of the other film. In this example, the color combining element 18 is formed of two multilayer films, but it can be formed of one multilayer film functioning as both the multilayer film R and the multilayer film G, though the number of layers increases.

The beams 12r, 12g, and 12b incident on the color combining element 18 are transmitted through, reflected by, and transmitted through the color combining face 19, respectively, thus combining the optical paths. The color combining face 19 has the property of removing unnecessary polarized light (s-polarized component in this case) from the red color beam 12r. Thus, the red beam 12r, the green beam 12g, and the blue beam 12b exiting from the respectively reflective panels are combined after unnecessary light (having unnecessary polarization direction) reduced twice (or plural times) from each beam, and projected on a projected surface (e.g., a screen), not shown, through a projection optical system 20. In FIG. 1, the projection optical system 20 can be arranged on the downside of the color combining element 18. In such a case, the green beam 12g is transmitted through the color combining element 18 to enter the projection optical system 20. The projection optical system 20 does not have to include refractive lenses only. It can include mirrors only or a combination of refractive lenses and mirrors. It can also include a diffraction grating, prism, other optical elements as known by one of ordinary skill in the relevant arts, and equivalents.

Further, the color combining system can be such that a λ/2 wave plate (an optical element to give a phase difference of λ/2) is arranged between the wavelength-selective polarizer 17 and the color combining element 18, and another color combining element 18' is placed instead of the color combining element 18 having the properties shown in FIG. 2. The color combining element 18' has properties that reverse the properties related to blue light and red light.

The exemplary embodiment implements the color combining system for combining color beams exiting from the reflective liquid crystal panels in the above-mentioned simple structure, but it is not limited to the structure. The exemplary embodiment is applicable to a color separating system by arranging the elements in reverse order. For example, when the first exemplary embodiment is applied to a color separating system, the color separating system can be implemented as follows: Light from the light source is converted into a p-polarized red beam, an s-polarized green beam, and an s-polarized blue beam, respectively. The flux of converted beams enter an optical element arranged in the position of the optical element 5 in FIG. 1 and having the same properties as the color combining element 18. The green beam is directed toward the reflective liquid crystal panel 11g for green light while the red and blue beams are directed toward the reflective liquid crystal panels 11b for red and blue light, respectively.

This structure is applicable to the following embodiment.

All the exemplary embodiments described in this specification can be combined arbitrarily within a consistent range.

SECOND EXEMPLARY EMBODIMENT

Figure 3:
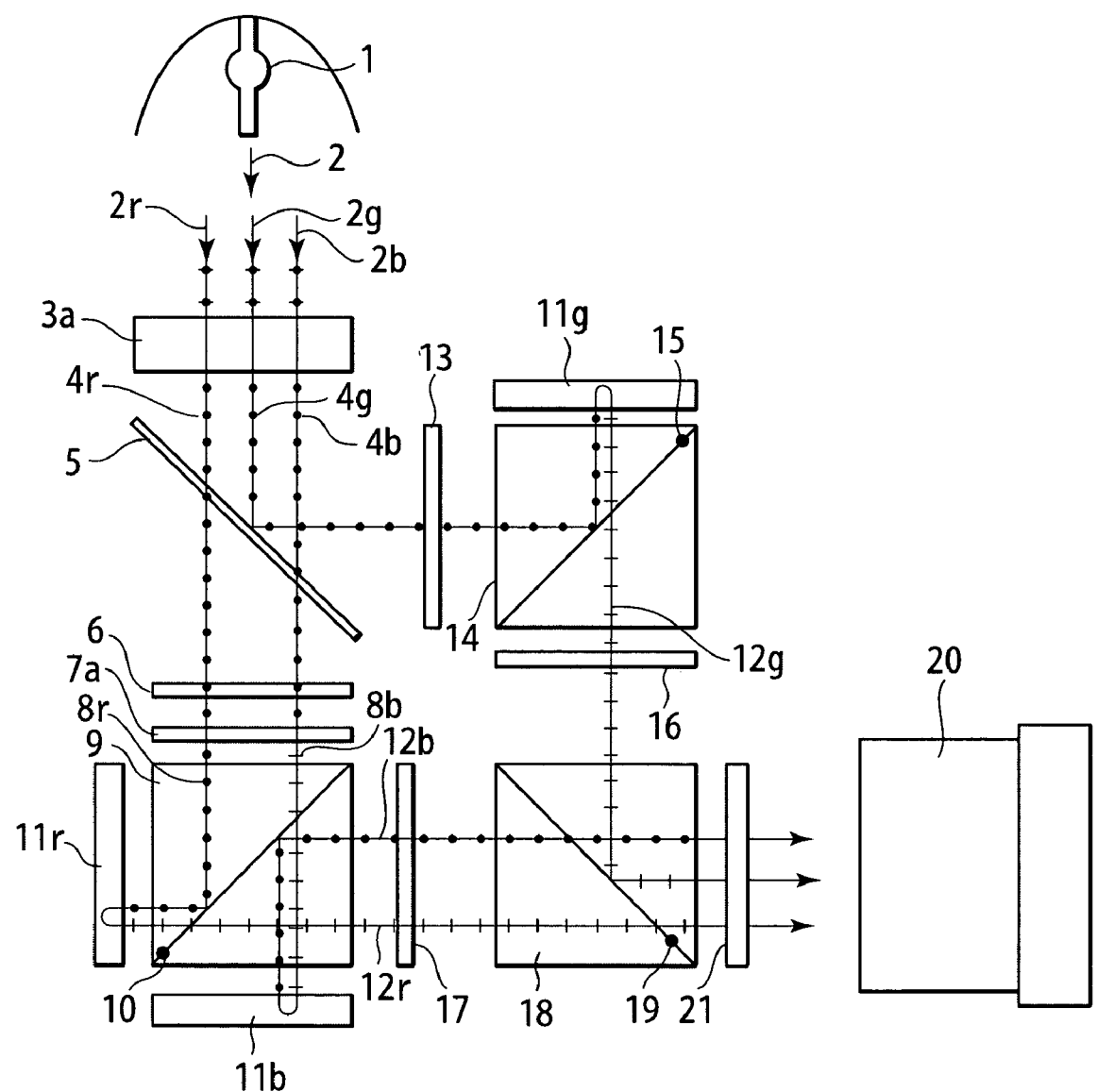
FIG. 3 illustrates the structure of a color separating/combining system according to a second exemplary embodiment.

FIG. 3 illustrates the structure of a second exemplary embodiment of a color separating/combining system. The second exemplary embodiment will be described in detail below which can use FIG. 3. Portions not described in detail below are the same as those in the first exemplary embodiment.

White light from a light source 1 is reflected by a reflector and turns into substantially parallel light. The white light can be separated into three primary colors of light. The separated color beams are called a red beam 2r, a green beam 2g, and a blue beam 2b, respectively.

A polarization converting element 3a located in the course of an illumination optical system brings these beams to the same s-polarization state (such a polarization state that the electric field vibrates in a direction substantially perpendicular to the paper surface of FIG. 3). As a result, these beams turn into an s-polarized red beam 4r, an s-polarized green beam 4g, and an s-polarized blue beam 4b, respectively. Although the three primary color beams are not spatially separated at this stage, they are spatially separated in FIG. 3 for convenience.

The optical element 5 (e.g., dichroic mirror) has the property of reflecting primarily green light, so that it facilitates the passage of the red and blue beams through while reflecting the green beam. The color beams 4r and 4b that passed through the optical element 5 passes through a polarizing plate 6 to increase their degree of polarization, and enter a wavelength-selective polarization rotating element 7.

The wavelength-selective polarization rotating element 7 has such a property as to rotate the polarization direction of the blue light component 90 degrees while not rotating the red light component. After passing through the wavelength-selective polarization rotating element 7, the red beam and the blue beam that are originally s-polarized light turn into an s-polarized red beam 8r and a p-polarized blue beam 8b, respectively, and enter a polarizing beam splitter 9.

The beam 8r incident on the polarizing beam splitter 9 is reflected on a polarization split face 10 to enter a reflective liquid crystal panel 11r. When a corresponding pixel in the reflective liquid crystal panel 11r is in an ON state (such a bright state to project light on a screen) and the red beam 8r enters the pixel, it turns into a p-polarized red beam 12r and enters the polarizing beam splitter 9 again. The p-polarized red beam 12r passes through the polarization split face 10 and exits from the polarizing beam splitter 9.

On the other hand, the blue beam 8b is p-polarized, so that it passes through the polarization split face 10 and enters a reflective liquid crystal panel 11b. When entering an on-state pixel in the reflective liquid crystal panel 11b, the blue beam 8b turns into an s-polarized blue beam 12b, and enters the polarizing beam splitter 9 again. Since the blue beam is s-polarized, it is reflected on the polarization split face 10 and exits from the polarizing beam splitter 9.

On the other hand, the beam 4g reflected by the optical element 5 passes through a polarizing plate 13 to increase its degree of polarization, and enters a polarizing beam splitter 14 to reach a polarization split face 15.

Since the green beam 4g is s-polarized, it is reflected on the polarization split face 15 and enters a reflective liquid crystal panel 11g. When entering an on-state pixel in the reflective liquid crystal panel 11g, the green beam 4g is converted (modulated) to a p-polarized green beam 12g and enters the polarizing beam splitter 14 again. The p-polarized green beam 12g is transmitted through the polarization split face 15 and exits from the polarizing beam splitter 14.

In addition to the ideal color beam component 12r, 12g, or 12b from a pixel in the ON state, each color beam exiting from each polarizing beam splitter and directed to a color combining element 18 contains light incident on pixels in the OFF state, that is, leakage light that reduces the contrast of an image. Therefore, such an unnecessary polarized component needs to be removed by some polarizing element.

The green beam 12g exiting from the polarizing beam splitter 14 reaches a polarizing element 16 by which the unnecessary polarized component is reduced. The beam 12g then enters the color combining element 18. In the exemplary embodiment, the polarizing element is such a common full-band polarizing plate that it also functions as a polarizing plate for red light as well as green light. The polarizing plate can also be such a wavelength-selective polarizer that it functions as a polarizing plate primarily for light in the green and red wavelength bands.

The red beam 12r and the blue beam 12b exiting from the polarizing beam splitter 9 reach a wavelength-selective polarizer 17. The wavelength-selective polarizer 17 functions as a polarizing plate primarily for blue light without affecting red light. Therefore, the unnecessary polarized component is reduced from the beam 12b, and the beam 12r with some unnecessary polarized component enters the color combining element 18.

FIG. 4 illustrates the properties of a color combining face 19 of the color combining element 18. FIG. 5B is a schematic illustration.

It is apparent from FIG. 5B that the color combining element 18 has such transmission properties as to transmit s-polarized blue light (second color light), reflects s-polarized green light (third color light), and transmits p-polarized red light (first color light) in this order from the shortest wavelength. The color combining element 18 can have any transmission properties related to light in the other bands and polarization states, that is, related to p-polarized blue light, p-polarized green light, and s-polarized red light. In at least one exemplary embodiment, the color combining element 18 can reflect the s-polarized red beam. In such a structure, the color combining face 19 functions as a polarizing beam splitter for red light. The details are the same as in the first exemplary embodiment.

FIG. 4 plots transmittance on the ordinate and wavelength on the abscissa. The transmittance on the ordinate is higher at the top and lower at the bottom. The wavelength on the abscissa is shorter on the left side and longer on the right side. FIG. 4 indicates that the color combining element has good transmission properties for blue light of both s- and p-polarization, and good reflection properties for green light of both s- and p-polarization. For red light, the color combining element functions as a polarizing beam splitter for transmitting p-polarization and reflecting s-polarization.

The red beam 12r, the green beam 12g, and the blue beam 12b incident on the color combining element 18 are transmitted through, reflected on, and transmitted through the color combining face 19, respectively, thus combining the optical paths of these beams (that, is, combining colors). As mentioned above, the color combining face 19 removes the unnecessary polarized component (s-polarized component in this case) from the red beam 12r because of its reflection property for red light.

The three color beams 12r, 12g, and 12b whose optical paths have been combined pass through a retardation plate 21 and are projected on a screen, not shown, through a projection lens 20.

The retardation plate 21 is a quarter-wave plate to give phase difference of about one-fourth of the wavelength; it converts color combined light into circularly-polarized light. The retardation plate 21 also gives phase difference of one-fourth of the wavelength of return light reflected on the surface of an element, (e.g., the surface of a lens in the projection optical system) through which the light was supposed to pass. As a result, the return light reflected in the projection optical system enters the color combining element 18 from the projection optical system in such a state that the polarization direction is rotated 90 degrees.

Note that among beams of return light, the return light of the green beam 12g and the return light of the blue beam 12b are returned along their optical paths and absorbed by the polarizing plates 16 and 17, respectively, because the color combining face 19 functions as a dichroic mirror for green and blue light. On the other hand, since the polarization direction of the return light of the red beam 12r is rotated 90 degrees, the return light of the red beam 12r is reflected on the color combining face 19, returned along its optical path, and absorbed by the polarizing plate 16. As mentioned above, the polarizing plate 16 also functions as a polarizing plate for red light.

Thus, since the return light reflected on a surface in the projection optical system is absorbed before reaching each panel surface, it is never re-reflected on the panel surface. In other words, such return light is never returned onto the screen, which can use no image degradation. In the second exemplary embodiment, among the three color beams, the first color beam (red beam) and the second color beam (blue beam) are combined by the polarizing beam splitter, and then the third color beam (green beam) is combined therewith. The color combining face 19 is used to combine the third color beam with the first and second color beams already combined. The color combining face 19 functions not only as a polarizing beam splitter for one of the first and second color beams, but also as a dichroic mirror for the other of the first and second color beams. The function of a dichroic mirror is to reflect or transmit beams for the same color regardless of their polarization directions, rather than to reflect or transmit the beams for the same color depending on the difference of their polarization directions, though some characteristic deviations could occur depending on the polarization direction. For the third color beam, the color combining face 19 also functions as a dichroic mirror in the second exemplary embodiment. However, it can function as a polarizing beam splitter. In such a case, the wavelength-selective polarizer 16 can also function as a polarizing plate for the third color beam (green beam), thereby reducing the effect of any light from the third color beam returning back though the projection optical system. However, it can be an element other than the polarizing plate (e.g., an element that absorbs all the third color beams (all the green beams) regardless of the difference of their polarization directions).

Assuming such a structure as mentioned above, the color combining face functions as a polarizing beam splitter for light (color light) in one or more (one or two) wavelength bands and as a dichroic mirror for light (color light) in one or more (two or one) wavelength bands.

Then, the wavelength-selective polarizer 17 is arranged between the polarizing beam splitter for combining the first and second color beams and the color combining face. The wavelength-selective polarizer 17 functions as a polarizing plate for one color beam for which the color combining face functions as the dichroic mirror while it does not function as the polarizing plate for the other color beam. Note that the polarizing plate is an optical member for transmitting light in a predetermined polarization direction and reflecting light in a polarization direction substantially perpendicular to the predetermined polarization direction.

The terms "transmitted" and "reflected" used to describe the aforementioned first and second exemplary embodiments can not mean that all the incident beams are transmitted or reflected. The terms are used to mean that 90 or more percent, for example 95 or more percent, of at least blue light (in a wavelength band of 420 to 500 nm, or 440 to 470 nm), green light (in a wavelength band of 500 to 570 nm, or 520 to 550 nm), and red light (in a wavelength band of 600 to 700 nm, or 620 to 650 nm) are transmitted or reflected, respectively.

Further, although in the exemplary embodiments the green beam is separated first and the red and blue beams are separated next, the order of separating the beams is not limited thereto. For example, the red or blue beam can be separated first. In such a case, the reflective liquid crystal panels for red, blue, and green can be placed in a different positional relationship, or the red and blue reflective liquid crystal panels can be reversed.

Furthermore, in the aforementioned embodiments, the color beams from the red reflective liquid crystal panel and the blue reflective liquid crystal panel are combined so that the combined light will enter the color combining element through the wavelength-selective polarizer 17 functioning as a polarizing plate primarily for blue light. In at least one exemplary embodiment the wavelength-selective polarizer 17 can function as a polarizing plate for a color of beam with the shortest wavelength in plural color beams passing through the wavelength-selective polarizer 17, both the first and second exemplary embodiments have such a structure. In at least one exemplary embodiment, the polarizing plates in the exemplary embodiments can have a function for transmitting light in a predetermined polarization direction and absorbing light in a polarization direction substantially perpendicular to the predetermined polarization direction. In this case, it can reflect light in the polarization direction substantially perpendicular to the predetermined polarization direction. However, when considering measures for return light, it will be better to absorb light in the polarization direction substantially perpendicular to the predetermined polarization direction.

In addition, in the first and second exemplary embodiments, the optical system arranged between the light source and the reflective liquid crystal elements is the illumination optical system, and the optical system for projecting light from the reflective liquid crystal elements onto a projected surface (e.g., a screen) is the projection optical system. In this structure, the polarizing beam splitter, the quarter-wave plate, are included in both the illumination optical system and the projection optical system.

The aforementioned embodiments can be combined arbitrarily within a consistent range. Further, the polarization states (s-polarization and p-polarization) of each color beam can be reversed.

Figure 8:
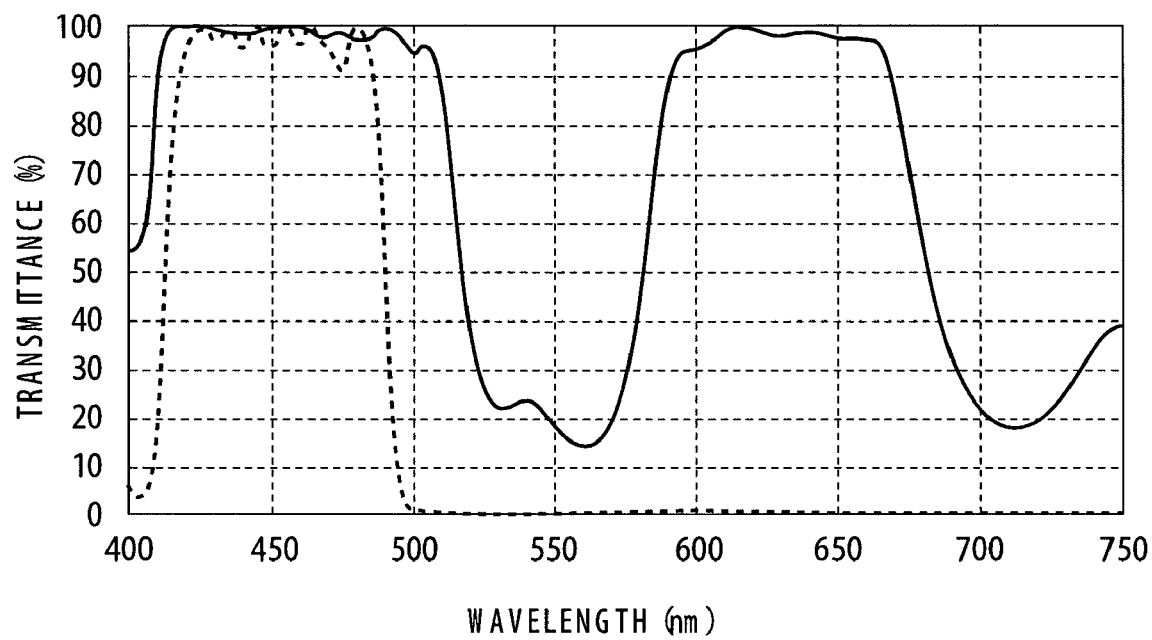
FIG. 8 illustrates the transmittance-versus-wavelength characteristics of a color combining element in accordance with at least one exemplary embodiment.

The following describes the details of the color combining element 18. Table 1 shows specific examples of the structure of the multiplayer film. FIG. 8 illustrates the transmittance-versus-wavelength characteristics of the color combining element 18 having the multilayer film for s- and p-polarized light.

The color combining element 18 includes an input side prism, multilayer films, an adhesive layer, and an output side prism, which are bonded in this order. Note that the elements can be bonded in a retrograde order, or they ma be optically contacted without the adhesive layer.

The term "input side prism" means a prism having a face on which the red and blue beams are incident (that is, on which plural beams different in color from and perpendicular in their polarization directions to each other are incident). The term "output side prism" means a prism opposite in function to the input side prism, that is, a prism having a face that faces the projection optical system in FIGS. 1 and 3.

The refractive index of the input side prism and the output side prism relative to light with a wavelength of 588 nm is 1.697, and the refractive index of the adhesive layer relative to light with the wavelength of 588 nm is 1.516. Film materials A, B, and C listed in the following table 1 are $TiO_2$, $SiO_2$, $Al_2O_3$, respectively. The refractive indexes of these materials relative to light with the wavelength of 588 nm are 2.315, 1.466, and 1.628, respectively.

TABLE 1

| No. of Layers | Film Material | Film Thickness(nm) |
|---|---|---|
| 1 | C | 36 |
| 2 | A | 89 |
| 3 | C | 69 |
| 4 | A | 105 |
| 5 | C | 31 |
| 6 | A | 84 |
| 7 | C | 57 |
| 8 | A | 96 |
| 9 | C | 87 |
| 10 | A | 77 |
| 11 | C | 90 |
| 12 | A | 91 |
| 13 | C | 73 |
| 14 | A | 85 |
| 15 | C | 40 |
| 16 | A | 102 |
| 17 | B | 50 |
| 18 | A | 94 |
| 19 | B | 122 |
| 20 | A | 86 |
| 21 | B | 177 |
| 22 | A | 107 |
| 23 | B | 200 |
| 24 | A | 85 |
| 25 | B | 175 |
| 26 | A | 89 |
| 27 | B | 175 |
| 28 | A | 83 |
| 29 | B | 202 |
| 30 | A | 103 |
| 31 | B | 198 |
| 32 | A | 89 |
| 33 | C | 185 |

The exemplary embodiments can be summarized as follows.

An image display apparatus of at least one of the exemplary embodiments comprises:

a first light modulating element (e.g., 11r in FIG. 1) configured to modulate light in a first wavelength band;

a second light modulating element (e.g., 11b in FIG. 1) configured to modulate light in a second wavelength band different from the first wavelength band;

a third light modulating element (e.g., 11g in FIG. 1) configured to modulate light in a third wavelength band different from both the first wavelength band and the second wavelength band;

a first color combining element (e.g., 9 in FIG. 1) configured to combine a first image light (e.g., 12r in FIG. 1) exiting from the first light modulating element and second image light (e.g., 12b in FIG. 1) exiting from the second light modulating element; a second color combining element (e.g., 18 in FIG. 1) configured to combine a third image light (e.g., 12g in FIG. 1) modulated by the third light modulating element with the first image light and the second image light combined by the first combining element to form color combined image light; and a projection optical system (e.g., 20 in FIG. 1) configured to project the combined image light formed by the second color combining element onto a projected surface.

In at least one exemplary embodiment the first image light enters the second color combining element in the form of a first substantially linearly-polarized beam (e.g., the hatched lines on the optical paths, i.e. p-polarized beam in FIG. 1).

The second image light enters the second color combining element in the form of substantially a second substantially linearly-polarized beam (e.g., the dots on the optical paths, i.e. s-polarized beam in FIG. 1).

The polarization direction of the first substantially linearly-polarized beam and the polarization direction of the second substantially linearly-polarized beam are substantially perpendicular to each other.

In yet a further exemplary embodiment
the second color combining element (e.g., 18 in FIG. 1) guides the first substantially linearly-polarized beam of the light in the first wavelength band to the projection optical system, which transmits it (e.g., 20 in FIG. 1) and blocks the second substantially linearly-polarized beam of the light in the first wavelength band from entering the projection optical system, which reflects it, while it guides both the first substantially linearly-polarized beam and the second substantially linearly-polarized beam of the light in the second wavelength band to the projection optical system, which transmits both.

In an apparatus according to at least one exemplary embodiment, the second color combining element and the projection optical system are so arranged that the second color combining element will guide, to the projection optical system, one of the first and second substantially linearly-polarized beams that has been transmitted through the second color combining element The first substantially linearly-polarized beam can enter the second color combining element in the p-polarization state, and the second substantially linearly-polarized beam can enter the second color combining element in the s-polarization state.

An apparatus in accordance with at least one exemplary embodiment also comprises a first polarizing element (17 in FIG. 1) arranged between the first color combining element and the second color combining element.

The first polarizing element can transmit both the first and second substantially linearly-polarized beams of the light in the first wavelength band (which transmits red light in FIG. 1, regardless of its polarization direction), and transmits one of the first and second substantially linearly-polarized beams of the light in the second wavelength band while absorbing or reflecting the other (it will be better to absorb it).

The apparatus can further comprise a quarter-wave plate (21 in FIG. 3) arranged between the second color combining element and the projection optical system.

An apparatus in accordance with at least one exemplary embodiment further comprises a second polarizing element (16 in FIG. 1) arranged between the third light modulating element and the second color combining element, where the second polarizing element transmits one of the two substantially linearly-polarized beams of at least the light in the third wavelength band, the substantially linearly-polarized beams being substantially perpendicular in polarization direction to each other, while absorbing the other.

In an apparatus in accordance with at least one exemplary embodiment, the second polarizing element transmits one of the substantially linearly-polarized beams of the light in the first wavelength band while absorbing the other. In other words, the second polarizing element functions as a polarizing plate for both the light in the first wavelength band and the light in the third wavelength band (for red light and green light in the exemplary embodiments shown in FIGS. 1 and 3). It can also function as a polarizing plate for the light in the second wavelength band.

An apparatus in accordance with at least one exemplary embodiment further comprises a polarization splitting element (14 in FIG. 1) arranged between the third light modulating element and the second polarizing element, where the polarization splitting element transmits one of the two substantially linearly-polarized beams of the light in the third wavelength band, the substantially linearly-polarized beams being perpendicular in polarization direction to each other, while reflecting the other.

In an apparatus in accordance with at least one exemplary embodiment, the second color combining element guides both the first and second substantially linearly-polarized beams of the light in the third wavelength band to the projection optical system.

In An apparatus in accordance with at least one exemplary embodiment, the polarization direction of the light in the first wavelength band and the polarization direction of the light in the second wavelength band are substantially perpendicular to each other with respect to a light input face of the first color combining element.

In an apparatus in accordance with at least one exemplary embodiment, the first, second, and third light modulating elements are illuminated with light from a light source emitting non-polarized light.

An apparatus in accordance with at least one exemplary embodiment further comprises
a polarization converting element configured to convert beams of light in the first, second, and third wavelength bands into substantially linearly polarized beams having the same polarizing direction, and a dichroic mirror configured to separate the substantially linearly polarized beam in the third wavelength band from the substantially linearly polarized beams in the first and second wavelength bands, all the beams having the same polarizing direction.

According to the exemplary embodiments, the projector (that is, the color separating/combining system in the projector) can not only achieve higher-contrast performance at a lower cost in a simple structure, but also provides higher-contrast images with reduced ghost caused by return light from the projection lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2004-252317, filed Aug. 31, 2004, which is hereby incorporated by reference herein in its entirety.

What is claimed is:

1. An image display apparatus comprising:
   a first light modulating element configured to modulate light in a first wavelength band;
   a second light modulating element configured to modulate light in a second wavelength band different from the first wavelength band;
   a third light modulating element configured to modulate light in a third wavelength band different from both the first wavelength band and the second wavelength band;
   a first color combining element configured to combine a first image light exiting from the first light modulating element and a second image light exiting from the second light modulating element;
   a second color combining element configured to combine a third image light modulated by the third light modulating element with the first image light and the second image light combined by the first combining element to form color combined image light; and
   a projection optical system configured to project the color combined image light formed by the second color combining element onto a projected surface, wherein the first image light enters the second color combining element in the form of a substantially linearly-polarized first beam having a first polarization component, wherein the second image light enters the second color combining element in the form of a substantially linearly-polarized second beam having a second polarization component, wherein a polarization direction of the first polarization component and a polarization direction of the second polarization component are substantially perpendicular to each other, and wherein the second color combining element is configured to guide a linearly-polarized light having the first polarization component in the first wavelength band to the projection optical system and blocking a linearly-polarized light having the second polarization component in the first wavelength band from entering the projection optical system, and of guiding a linearly-polarized light having the first polarization component and a linearly-polarized light having the second polarization component in the second wavelength band to the projection optical system.

2. The apparatus according to claim 1, wherein the second color combining element and the projection optical system are so arranged that the second color combining element will guide, to the projection optical system, the first image light and the second image light by transmitting the first image light and the second image light through the second color combining element, the first beam enters the second color combining element in a p-polarization state, and the second beam enters the second color combining element in an s-polarization state.

3. The apparatus according to claim 1 further comprising a first polarizing element arranged between the first color combining element and the second color combining element, wherein the first polarizing element is configured to transmit a linearly-polarized light having the first polarization component in the first wavelength band and a linearly-polarized light having the second polarization component in the first wavelength band and a linearly-polarized light having one of the first and second polarization components in the second wavelength band and absorbing or reflecting a linearly-polarized light having the other in the second wavelength band.

4. The apparatus according to claim 1 further comprising a quarter-wave plate arranged between the second color combining element and the projection optical system.

5. The apparatus according to claim 1 further comprising:

a second polarizing element arranged between the third light modulating element and the second color combining element, wherein the second polarizing element transmits one of the two linearly-polarized beams at least in the third wavelength band, the linearly-polarized beams being perpendicular in polarization direction to each other, while absorbing the other.

6. The apparatus according to claim 5, wherein the third beam transmitted has polarizing element light in the first wavelength band.

7. The apparatus according to claim 5 further comprising:

a polarization splitting element arranged between the third light modulating element and the second polarizing element, wherein the polarization splitting element transmits one of two polarizations of a third beam, while reflecting the other, where the third beam has light in the third wavelength band, the two polarizations being substantially perpendicular to each other.

8. The apparatus according to claim 1 wherein the second color combining element guides both the first and second linearly-polarized beams of the light in the third wavelength band.

9. The apparatus according to claim 1 wherein the polarization direction of the light in the first wavelength band and the polarization direction of the light in the second wavelength band are substantially perpendicular to each other with respect to a light input face of the first color combining element.

10. The apparatus according to claim 1 wherein the first, second, and third light modulating elements are illuminated with light from a light source emitting non-polarized light.

11. The apparatus according to claim 1 further comprising
a polarization converting element configured to convert beams of light in the first, second, and third wavelength bands into substantially linearly polarized beams having the same polarizing direction, and a dichroic mirror configured to separate the substantially linearly polarized beam in the third wavelength band from the substantially linearly polarized beams in the first and second wavelength bands, all the beams having the same polarizing direction.

12. A color combining unit comprising:

a first color combining element configured to combine a first image light in a first wavelength band and a second image light in a second wavelength band different from the first wavelength band; and a second color combining element configured to combine a third image light in a third wavelength band different from both the first and second wavelength bands with the first image light and the second image light combined by the first color combining element to form color combined image light;

wherein the first image light enters the second color combining element in the form of a substantially linearly-polarized first beam, wherein the second image light enters the second combining element in the form of a substantially linearly-polarized second beam, wherein a polarization direction of the linearly-polarized first beam and a polarization direction of the linearly-polarized second beam are substantially perpendicular to each other, and wherein the second color combining element is configured to be penetrated by the linearly-polarized first beam in the first wavelength band and reflect the linearly-polarized second beam in the first wavelength band and to be penetrated by or reflect both the linearly-polarized first and second beams in the second wavelength band.

13. An image display apparatus for projecting an image on a projection plane comprising:

a first color combining element configured to combine a first image light in a first wavelength band and a second image light in a second wavelength band different from the first wavelength band; and a second color combining element configured to combine a third image light in a third wavelength band different from both the first and second wavelength bands with the first image light and the second image light combined by the first color combining element to form color combined image light;

wherein the first image light enters the second color combining element in the form of a substantially linearly-polarized first beam, wherein the second image light enters the second combining element in the form of a substantially linearly-polarized second beam, wherein a polarization direction of the linearly-polarized first beam and a polarization direction of the linearly-polarized second beam are substantially perpendicular to each other, and wherein the second color combining element is configured to guide the linearly-polarized first beam in the first wavelength band to the projection plane and block the linearly-polarized second beam in the first wavelength band from entering the projection plane and to guide both the linearly-polarized first and second beams in the second wavelength band to the projection plane.

14. An image display apparatus according to claim 13, wherein the second color combining element is configured to be penetrated by the linearly-polarized first beam in the first wavelength band and reflect the linearly-polarized second beam in the first wavelength band and to be penetrated by or reflect both the linearly-polarized first and second beams in the second wavelength band.

15. An image display apparatus according to claim 13, wherein the second color combining element is configured to be penetrated by or reflect both the linearly-polarized first and second beams in the first wavelength band and to be penetrated by the linearly-polarized first beam in the second wavelength band and reflect the linearly-polarized second beam in the second wavelength band.

\* \* \* \* \*